O. PITTACK & A. B. WARMAN.
CASTER.
APPLICATION FILED APR. 22, 1912.
1,039,590.
Patented Sept. 24, 1912.
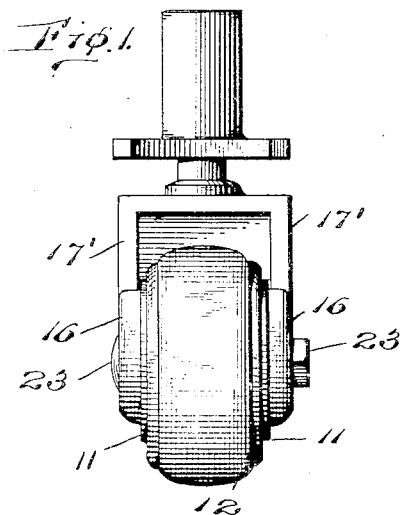
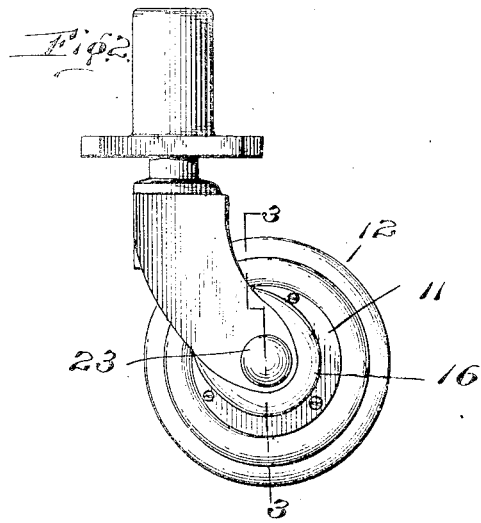
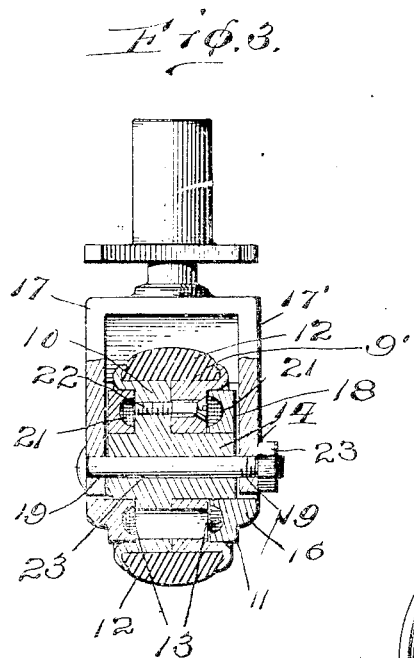
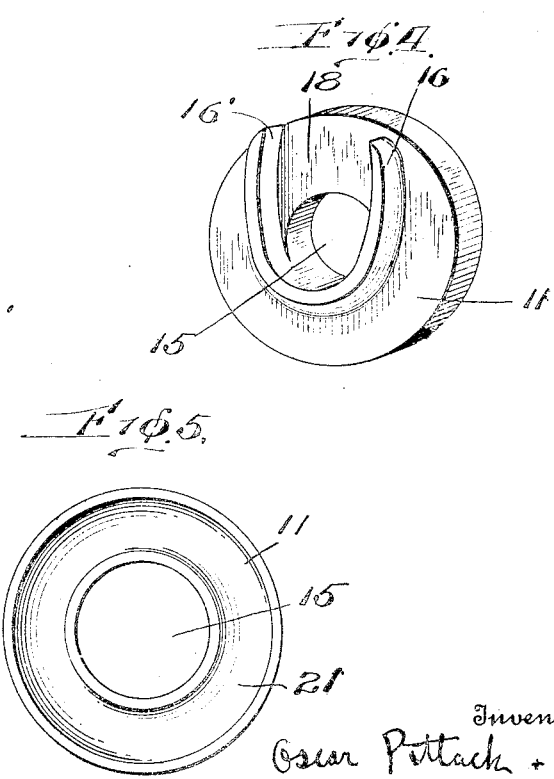
Witnesses
R. S. Trogner
H. W. Hime
Inventor
Oscar Pittack &
Andrew B. Warman
By Mason Fenwick Lawrence
Attorneys

UNITED STATES PATENT OFFICE.

OSCAR PITTACK AND ANDREW B. WARMAN, OF SCRANTON, PENNSYLVANIA.

CASTER.

1,039,590.  Specification of Letters Patent.  Patented Sept. 24, 1912.

Application filed April 22, 1912. Serial No. 692,397.

*To all whom it may concern:*

Be it known that we, OSCAR PITTACK and ANDREW B. WARMAN, citizens of the United States, residing at Scranton, in the county of Lackawanna and State of Pennsylvania, have invented certain new and useful Improvements in Casters; and we do hereby declare the following to be a full, clear, and exact description of the invention, such as will enable others skilled in the art to which it appertains to make and use the same.

This invention relates to improvements in casters and has for an object to provide the ordinary caster with means for preventing the collection of dust around the caster bearing.

A further object of the invention is to reduce the friction in such a bearing to a minimum.

With these and other objects in view the invention consists in certain novel constructions and combinations of parts as will be hereafter more fully described and claimed.

In the drawings—Figure 1 is a front elevation of an ordinary caster equipped with our improvement. Fig. 2 is a side view of the caster illustrated in Fig. 1. Fig. 3 is a vertical section taken along line 3—3 of Fig. 2. Fig. 4 is a perspective view of the outer side of the disk forming the subject matter of our invention. Fig. 5 is a side elevation of the inner surface of the disk shown in Fig. 4.

In the general embodiment of our invention, the ordinary caster is provided with a pair of disks, each of which is provided with raised ribs which form dust tight connections with the arms of the yoke supporting the caster wheel.

In the accompanying drawings an ordinary caster is shown having a yoke 17 with yoke arms 17′ which are provided with the usual journals 19 in their lower ends, the said journals supporting the usual shaft bolt 23. The wheel 12 carried by shaft 23 is formed in two parts, the body part 10 which is approximately one half of the width of the body part of the complete wheel being formed integral with the hub 14, while the part 9′ being in the form of a ring is adapted to be slipped over the hub 14 and be secured to part 10 by bolts 22. The hub 14 extends beyond either surface of the body portions 9 and 10, and forms with these parts, recesses into which fit disks 11. It will be seen by this construction that the space ordinarily left between the caster wheel and the arms of the yoke, is here filled with the disk 11, thus preventing the accumulation of dust in this space. On the inner surface of disk 11, as shown in Fig. 5, is formed an annular groove 21, the object of which is to reduce the friction between the revolving parts 9′ and 10 of the wheel 12 and the disk 11. Also this groove is made to bridge the heads of bolts 22 so that no wearing is produced on the disk by these bolts. As shown in Fig. 4 the outer surface of the disk 11 is provided with a raised rib 16 having an inner surface 16′ of the same general outline as that of the arms 17′. The disk 11 is also provided with a journal bearing 15 which is adapted to fit closely around hub 14, so that the disk 11 embraces the ends of hub 14 which extends beyond the body parts 9 and 10. The ribs 16 are made substantially U-shape and define a recess 18 above the journal 15. At the lower end of the U-shape ribs the surface 16′ is made continuous with a part of the surface of the journal 15 so that the curves of these two surfaces are tangent internally at the rounded part of the rib.

In assembling this caster the parts 9 and 10 are bolted together by screw 22, the disks 11 are then inserted in the recess formed about the ends of hub 14 and the disks 11 are turned so that ribs 16 will receive the arms 17′ which will be received by the recess 18, of the yoke 17, after which shaft bolt 23 is put in place.

From this construction it will be seen that the edges of the arms 17 are made to form a fairly tight connection with a stationary member mounted upon the hub of the wheel. In this way all communication with the caster bearings is effectively closed and no way is left for dust to enter.

We claim:

1. In combination, a caster wheel embodying a hub and providing annular recesses, disks having openings arranged around the hub and in the annular recesses, said disks supporting ribs to encircle said openings and forming recesses, yoke arms incased in said recesses, and the walls of the ribs and openings being in partial alinement.

2. In combination, a caster wheel embodying a hub and providing annular recesses, disks having openings arranged around the hub and in the annular recesses, said disks supporting ribs to encircle said openings and forming recesses, yoke arms incased in said recesses, and means for providing a minimum frictional surface upon the disks, said means comprising shoulders formed by annular apertures, said shoulders revolving in the annular recesses.

3. In combination, a caster wheel, provided with a hub, disks embracing said hub, U-shaped ribs on said disks and yoke arms carrying the hub and fitting snugly with said ribs.

4. In combination, a caster wheel comprising a hub provided with annular flanges, disks provided with U-shaped ribs, said disks being retained by the flanges and yoke arms carrying the hub and surrounded by the ribs.

In testimony whereof we affix our signatures in presence of two witnesses.

OSCAR PITTACK.
ANDREW B. WARMAN.

Witnesses:
L. P. WEDEMAN,
C. H. SEVERANCE.